April 9, 1935.  M. J. BERLYN  1,997,246
REMOTE CONTROL APPARATUS FOR ELECTRICALLY ACTUATED VALVES AND OTHER DEVICES
Filed Jan. 14, 1933  10 Sheets-Sheet 1

INVENTOR
MARTIN J. BERLYN
BY J. B. O'Connell
ATTORNEY

April 9, 1935.  M. J. BERLYN  1,997,246

REMOTE CONTROL APPARATUS FOR ELECTRICALLY ACTUATED VALVES AND OTHER DEVICES

Filed Jan. 14, 1933  10 Sheets-Sheet 2

INVENTOR
MARTIN J. BERLYN
BY J. D. O'Connell
ATTORNEY

April 9, 1935.  M. J. BERLYN  1,997,246
REMOTE CONTROL APPARATUS FOR ELECTRICALLY ACTUATED VALVES AND OTHER DEVICES
Filed Jan. 14, 1933  10 Sheets-Sheet 4
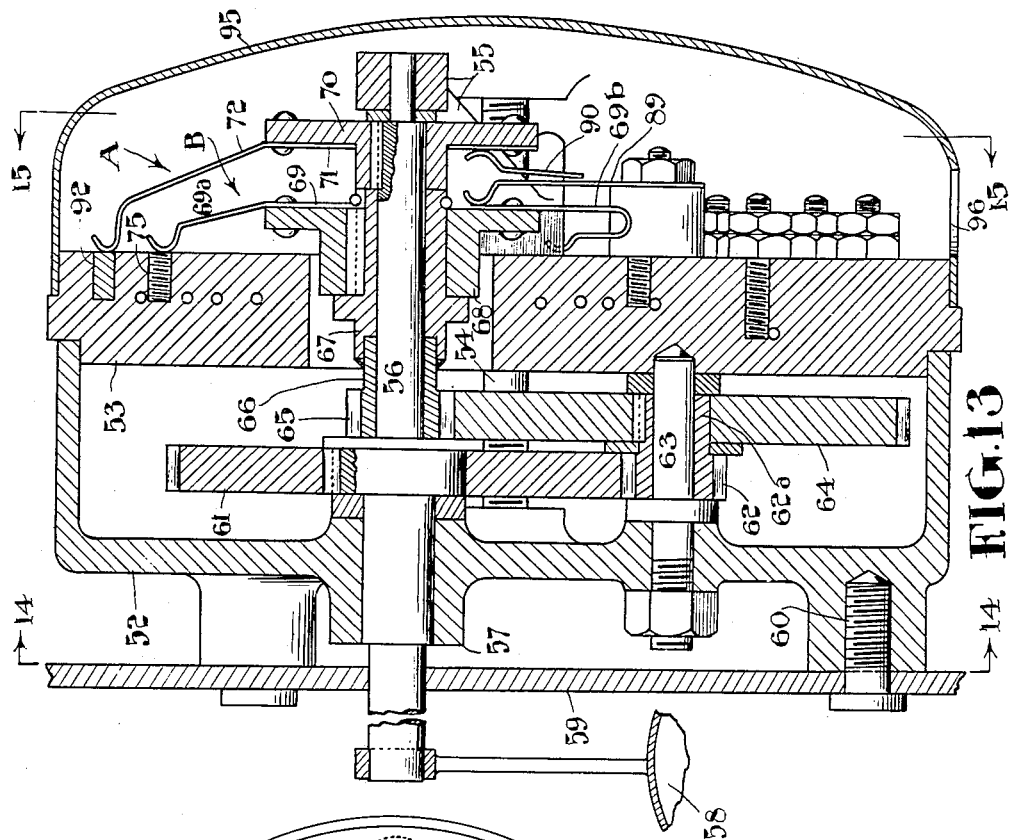
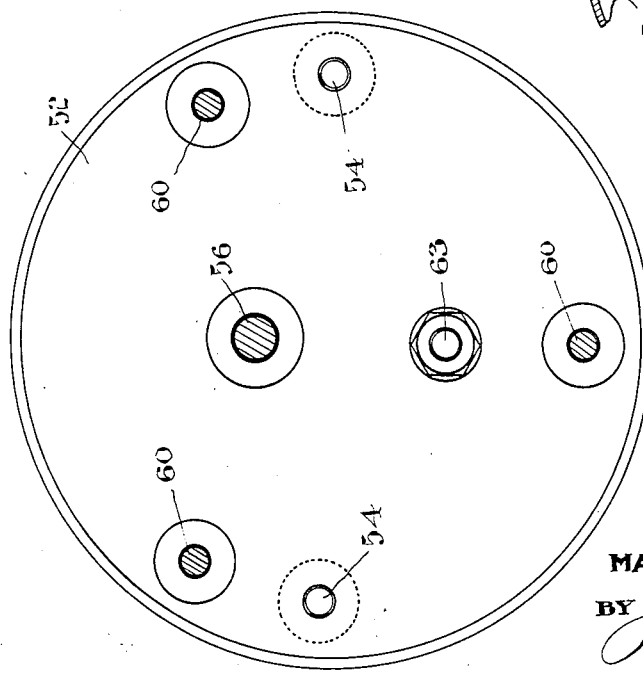
INVENTOR
MARTIN. J. BERLYN
BY J. D. O'Connell
ATTORNEY

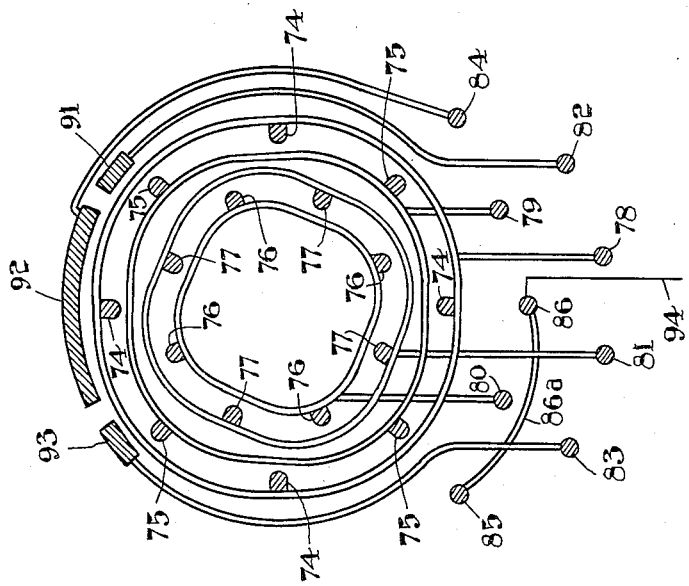
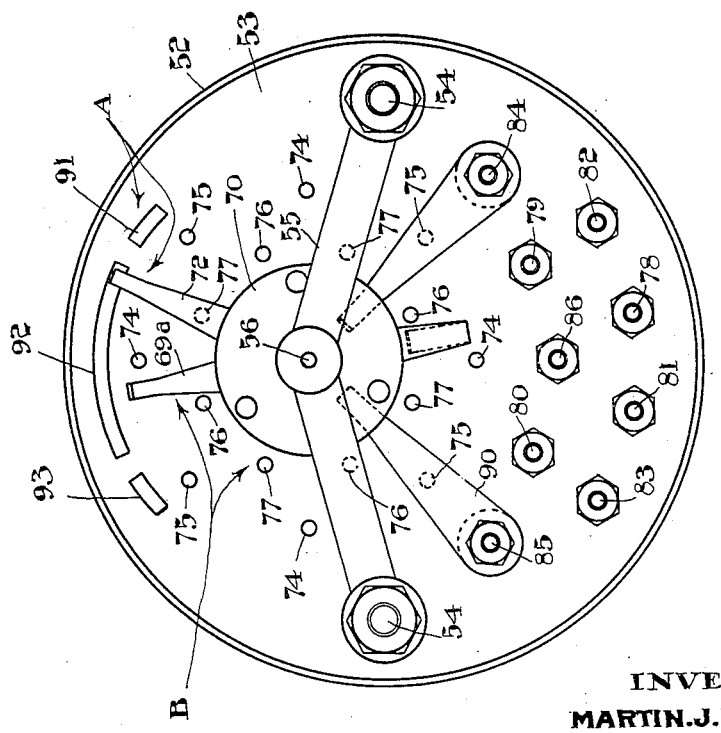

April 9, 1935.　　　　M. J. BERLYN　　　　1,997,246
REMOTE CONTROL APPARATUS FOR ELECTRICALLY ACTUATED VALVES AND OTHER DEVICES
Filed Jan. 14, 1933　　　10 Sheets-Sheet 6

INVENTOR
MARTIN J. BERLYN
BY J. L. O'Connell
ATTORNEY

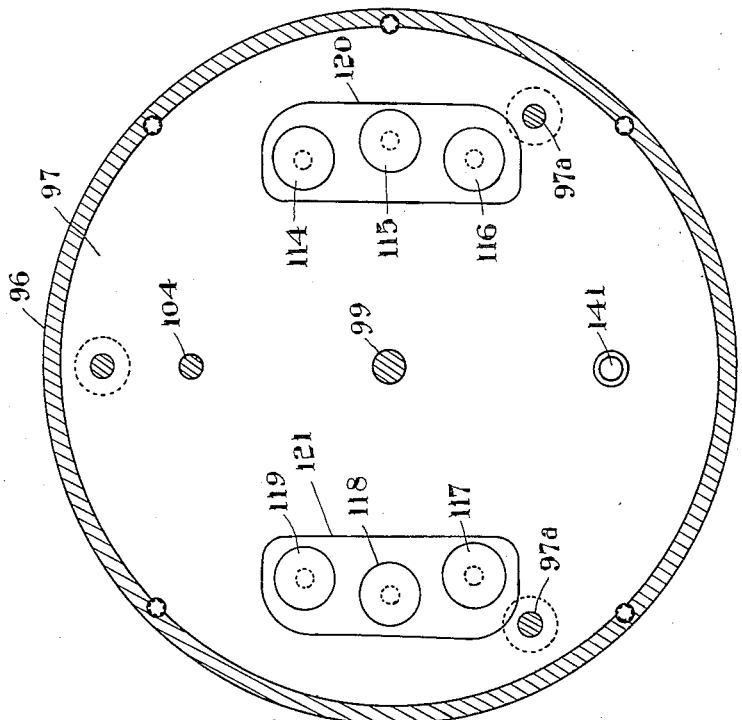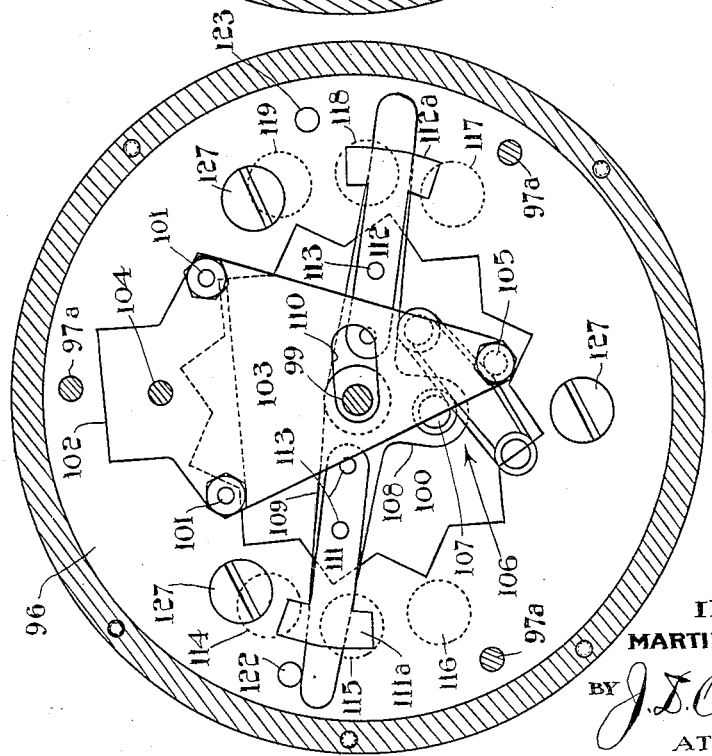

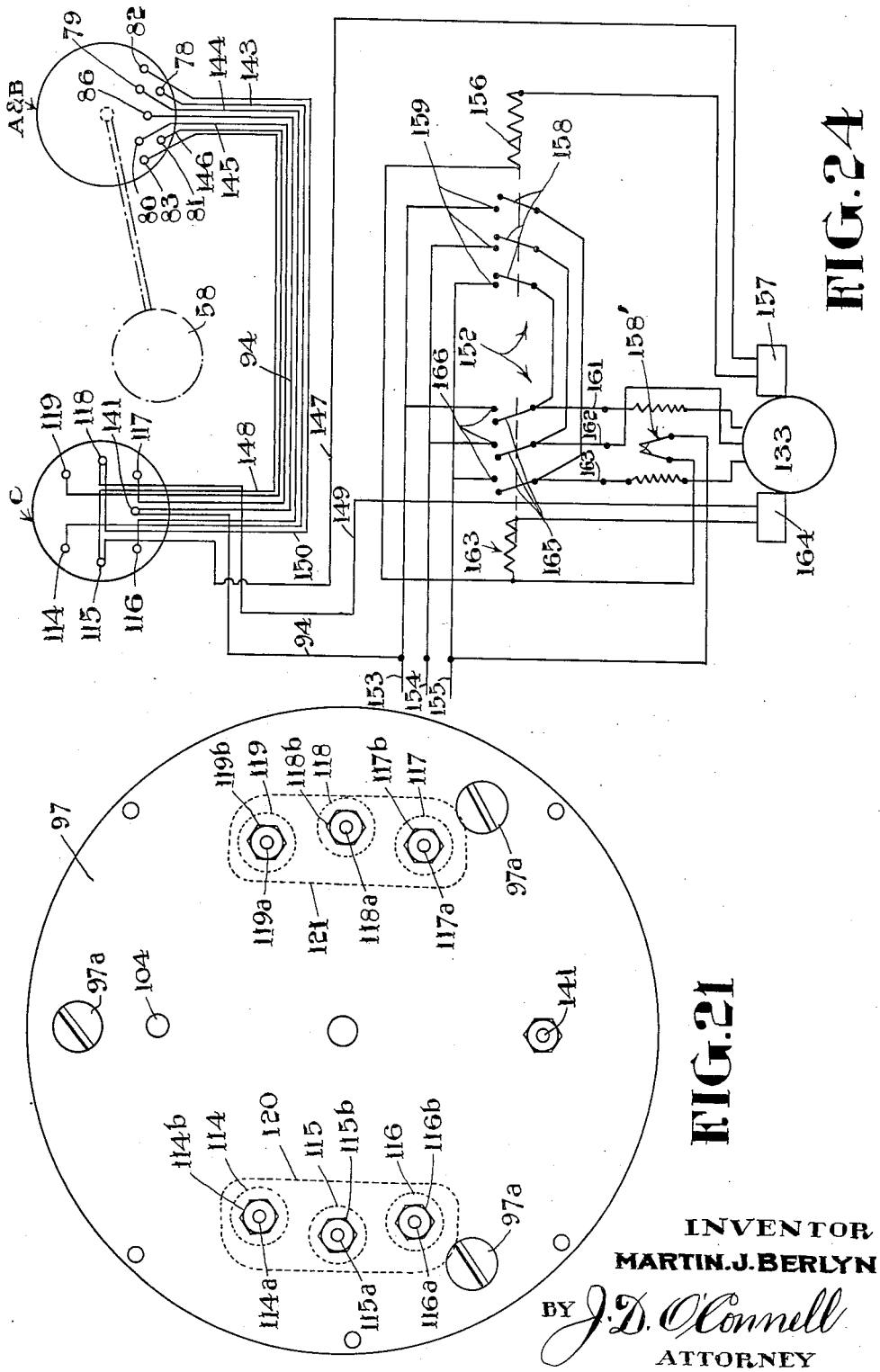

Patented Apr. 9, 1935

1,997,246

UNITED STATES PATENT OFFICE 1,997,246

REMOTE CONTROL APPARATUS FOR ELECTRICALLY ACTUATED VALVES AND OTHER DEVICES

Martin J. Berlyn, Montreal, Quebec, Canada, assignor to Dominion Engineering Works Limited, Lachine, Quebec, Canada Application January 14, 1933, Serial No. 651,832

6 Claims. (Cl. 172—239)

This invention relates to improvements in remote control apparatus for electrically actuated devices and comprises a novel arrangement of switches and electrical connections through which current is supplied to a contactor, reversing switch, or the like to control the operation, direction, and range of movement of a motor driven valve or other electrically actuated device in response to the movements of a primary control member located at a remote point.

More particularly, the present invention provides two electrically connected but mechanically separated switch mechanisms which may be located at widely separated points, the movable contacts of one switch mechanism being actuated by the primary control member and the movable contacts of the other being actuated by the motor driven valve or other electrically actuated device which it is desired to control. These two switch mechanisms operate to conjointly connect a lead-in wire to one or the other of a pair of conductors, dependent upon the direction in which the primary control member is moved. The two conductors are preferably connected to a contactor or reversing switch which causes the valve or other electrically actuated device to operate in one direction when current is flowing in one of said conductors and in the opposite direction when current is flowing in the companion conductor. These conductors may also be utilized in various other ways for changing the direction of operation of the valve or other controlled device as the current is switched from one conductor to the other. Continued movement of the primary control member in one direction results in an intermittent flow of current from the lead-in wire to one of said conductors and causes a step-by-step actuation of the valve or other controlled device in one direction. This is due to the fact that a predetermined movement of the controlled device in response to current flow in said conductor changes the setting of the connected switch mechanism and disrupts the connection previously established between said conductor and the lead-in wire. As the control member continues to move in the same direction other paths for the flow of current between said conductor and lead-in wire are periodically established and disrupted in the same manner. The same conditions obtain during continued movement of the primary control member in the opposite direction except that, in this case, the lead-in wire is intermittently connected to and disconnected from the companion conductor to effect a step-by-step movement of the controlled member in the reverse direction. For certain installations provision may also be made for directly connecting the lead-in wire to either of said conductors to provide for a continuous full range movement of the controlled element in either direction under conditions where intermittent movement of the controlled member is temporarily impractical or undesirable.

Figs. 1 to 12 inclusive are diagrammatic illustrations of one form of remote control apparatus devised in accordance with the present invention. These views show different operating positions of three switches A, B and C, which conjointly control the operation of an electrically actuated device in response to the movements of a control member at a remote point. In these figures the controlled member is assumed to be a motor operated fluid supply valve and the control member is illustrated as a float assumed to operate in a tank receiving fluid through said valve, the three switches, under normal conditions, serving to control opening and closing of the valve according to the movements of the float so as to maintain the water level in the tank approximately constant within certain limits.

Fig. 13 is a sectional view of a switch assembly illustrating one method of combining switches A and B.

Fig. 14 is a view of the assembly shown in Fig. 13 as it appears when looking in the direction indicated by line 14—14 of Fig. 13.

Fig. 15 is a sectional view along the line 15—15 of Fig. 13. In this view the cover appearing at 95 in Fig. 13 is omitted.

Fig. 16 is a diagrammatic view of the connections between certain switch contacts and terminals appearing in Figs. 13 and 15.

Fig. 19 is a sectional view along the line 19—19 of Fig. 17.

Fig. 20 is a sectional view along the line 20—20 of Fig. 17.

Fig. 21 is a view looking in the direction indicated by the line 21—21 of Fig. 17. In this view the cover appearing at 124 in Fig. 17 is omitted.

Fig. 24 is a diagrammatic view illustrating the electrical connections to switches A, B and C.

Figure 1:
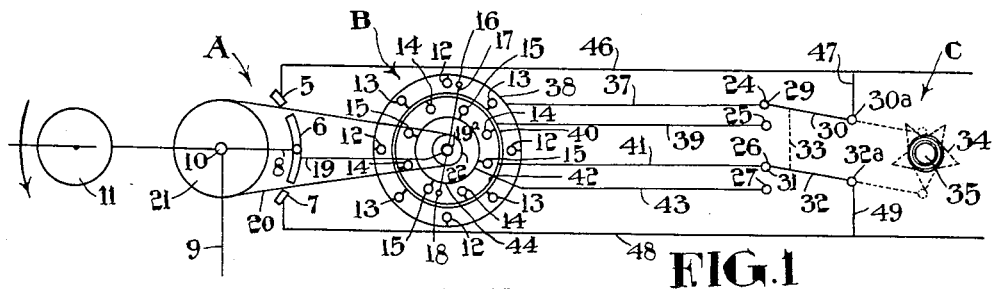

In describing one application of this invention, reference will be had initially to the diagrammatic illustrations appearing in Figs. 1 to 12 inclusive. As here shown the invention comprises three switches designated A, B and C.

Switch A is a float operated switch which, for the purpose of this discussion, may be assumed to operate in a tank (not shown) to which water is supplied through the valve hereinafter referred to. Said switch comprises three stationary contacts 5, 6, and 7 adapted to be engaged by a movable contact arm 8 that is supplied with current through the lead in conductor 9 and is fixed to a spindle 10 operated by the float 11.

Switch B includes four sets of stationary contacts 12, 13, 14 and 15 arranged in two concentric circles, the contacts 12 and 13 being alternately arranged in the outer circle and the contacts 14 and 15 being similarly arranged in the inner circle. The contacts 12 and 13 are adapted to be successively engaged by a terminal 16 at one end of a rotary contact arm 17. A terminal 18 at the opposite end of arm 17 is adapted to successively engage the contacts 14 and 15. A conductor 19 connects arm 17 to the stationary contact 6 of switch A.

The arm 17 of which B is fixed to a spindle 19a that is geared to the spindle 10 of switch A so that arm 17 moves in unison with arm 8 whenever the spindle 10 is rotated in response to movements of the float 11. The mechanical gearing between the two spindles may be of any suitable type. As here shown, it comprises a belt 20 connecting a pulley 21 on the spindle 10 with a pulley 22 on the spindle 19a, the relative sizes of the pulleys being predetermined to afford any desired gear ratio.

Switch C is a snap-acting throw over switch that is at rest only in either of two circuit closing positions. For present purposes it is assumed that the cam, hereinafter referred to, which operates the movable contacts of this switch is actuated by the valve spindle of the motor driven valve assembly set forth in my copending application Serial No. 612,146 filed May 18, 1932.

As here shown, switch C comprises four stationary contacts designated 24, 25, 26 and 27. Contacts 24 and 25 are adapted to be alternately engaged by a terminal 29 at one end of a movable contact arm 30. Contacts 26 and 27 are adapted to be alternately engaged by a terminal 31 at one end of a movable contact arm 32. These arms 30 and 32 are electrically insulated from each other but are mechanically linked together, as at 33, so that they move in unison about their intermediate pivots 30a and 32a in response to predetermined movements of an operating star-shaped cam 34. The points of the cam 34 engage with the ends of the arms 30 and 32 remote from the arm terminals 29 and 31 and serve to swing both arms in one direction or the other as the cam is revolved by rotation of its carrying spindle 35 which is assumed to be driven by the valve spindle forming part of the motor driven valve assembly described in my said prior application.

A quick acting spring toggle or other spring device (not shown) is associated with the arms 30 and 32 so that these arms are quickly thrown from one circuit closing position to the other when moved beyond their dead centre position by the cam 34 and are not permittted to maintain any intermediate position of rest. It has not been considered necessary to actually show a spring device of this character associated with the arms 30 and 32 since these devices are well known in the art.

Contacts 24 to 27 inclusive of switch C, are connected to contacts 12 to 15 inclusive, of switch B in the following manner:— contact 24 is connected by a line wire 37 to a conductor 38 that is common to contacts 12; contact 25 is connected by a line wire 39 to a conductor 40 that is common to contacts 13; contact 26 is connected by a line wire 41 to a conductor 42 that is common to contacts 14; and contact 27 is connected by a line wire 43 to a conductor 44 that is common to contacts 15.

The contact 5 of switch A is connected to a conductor 46 that is also connected, as at 47, to the arm 30 of switch C. Contact 7 of switch A is connected to a second conductor 48 that is connected, as at 49, to the arm 32 of switch C.

As an aid to understanding the manner in which the various switches co-operate to afford a remote control apparatus in accordance with the present invention the following preliminary remarks are offered for consideration.

In the present instance it is assumed that the float of switch A operates in a storage tank in which it is desired to maintain an approximately constant water level and that the supply of water to the tank is controlld by a motor operated valve having its valve spindle geared to the cam spindle 35 of switch C, said valve being, for example, a motor driven valve of the type set forth in my copending application previously referred to. It is also assumed that the conductors 46 and 48 lead to a suitable contactor or reversing switch which operates the valve motor to open the valve when current flows in conductor 46 and to close the valve when current flows in conductor 48.

Since the arms 30 and 32 of switch C are insulated from each other it will be apparent that the arm 30 and the co-operating stationary contacts 24 and 25 are concerned only with energizing the conductor 46 to effect operation of the valve motor in a valve opening direction whereas arm 32 and co-operating contacts 26 and 27 are concerned only with energizing the conductor 48 to effect operation of the valve motor in a valve closing direction. It will also be evident that the line wire or series connections between the stationary contacts of switches B and C are such that the same circuit must be closed in both switches at the same time in order to energize the conductor 46 or the conductor 48. For example, a path for the flow of current from lead-in wire 9 through switches B and C to the conductor 46 is provided only when (a) the movable terminal 16 engages a stationary contact 12 of switch B at a time when the movable terminal 29 of switch C is engaged with its co-operating stationary contact 24 or (b) when the movable terminal 16 of switch B is engaged with one of the contacts 13 at a time when the movable terminal 29 of switch C engages the stationary contact 25. Similarly, a path for the flow of current from lead-in wire 9 through switches B and C to the conductor 48 is obtained only when (a) the movable terminal 18 of switch B is engaged with a stationary contact 14 at a time when the terminal 31 of switch C is engaged with the stationary contact 26 or (b) when the movable terminal 18 of switch B is engaged with a stationary contact 15 at a time when the movable terminal 31 of switch C is engaged with the stationary contact 27. In each of the instances here referred to it is assumed, of course, that the arm 8 of switch A is engaged with the contact 6 which is connected to the movable arm of switch B.

Under a certain abnormal condition, hereinafter explained, the arm 8 of switch A may be moved out of engagement with the stationary contact 6 and into engagement with the contact 5 or the contact 7. When this occurs the switches B and C are disconnected and the lead-in wire 9 connected directly to the conductor 46 or to the conductor 48 depending upon the direction in which the arm 8 is moved. Such direct connection between the lead-in wire 9 and the conductor 46 operates the valve motor to quickly move the valve to a fully open position assuming there is current flow in the path thus provided. Likewise direct connection of the lead-in wire 9 to the conductor 48 operates the valve motor to quickly move the valve to a fully closed position.

It will now be shown that, when float 11 is falling, lead-in wire 9 is connected, through switches B and C, to conductor 46 to open the valve whenever the movable terminal 16 of switch B passes over one of the contacts 12 or 13. During this movement of the float the lead-in wire 9 is never connected to the conductor 48 through switches B and C since the movable terminal 18 of switch B does not touch the contacts 14 or 15 until after the connection between these contacts and the conductor 48 has been broken at switch C.

It will also be shown that, when the float is rising, the lead-in wire 9 is connected, through switches B and C, to the conductor 48 to close the valve whenever the movable terminal 18 of switch B touches one of the contacts 14 and 15. During this rising movement of the float, lead-in wire 9 is never connected to the conductor 46 through switches B and C since the movable terminal 16 of switch B does not touch the contacts 12 or 13 until after the connections between these contacts and the conductor 46 have been broken at switch C.

Normally, the movements of float 11 in response to changing water level conditions are such that arm 8 of switch A is always on some part of the stationary contact 6. Lead-in wire 9 is thus connected through arm 8, contact 6, and conductor 19 to the movable contact arm 17 of switch B. In Fig. 1 the arm 17 is shown with its terminals 16 and 18 clear of the co-operating stationary contacts 12, 13, 14 and 15. Consequently, no current can flow from the lead-in wire 9 to the conductor 46 or the conductor 48 so that the valve and the valve driven spindle 35 of switch C are at rest as long as the float 11 maintains the position shown in Fig. 1.

Figure 2:
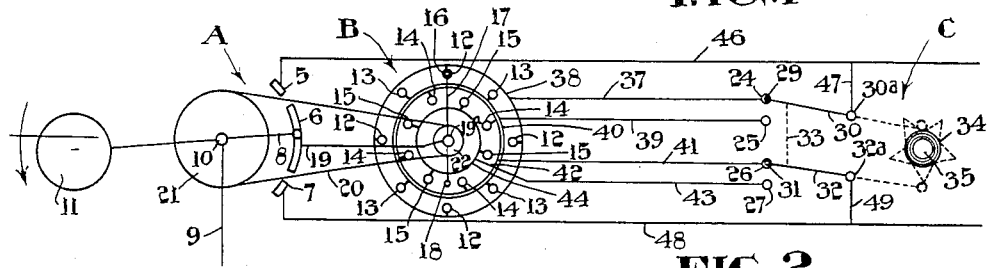

When the float falls from the position shown in Fig. 1 to that shown in Fig. 2, the resulting anticlockwise movement of arm 17 (switch B) causes the terminal 16 to engage the adjacent contact 12. Since contact 24 of switch C, is, at this time, engaged by the movable terminal 29 of arm 30 a path is provided through switches B and C for the flow of current from the lead-in wire 9 to the conductor 46 so that the valve motor is energized to move the valve in an opening direction.

In Fig. 2 the conductor 48 is connected to the contacts 14 of switch B through conductor 42, line wire 41, contact 26, arm 32, and conductor 49 but no current flows in said conductor 48 since the connection between contacts 14 and the lead-in wire 9 is broken at switch B.

Figure 3:
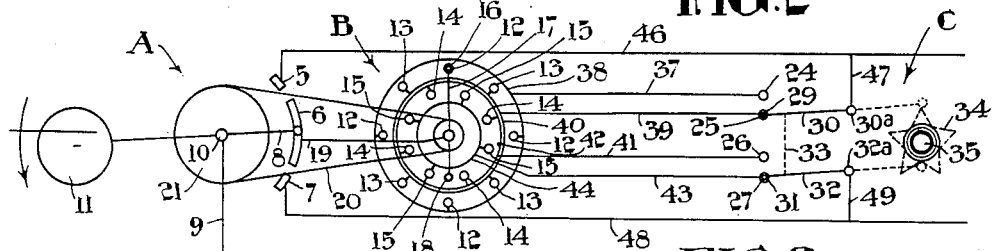
Figure 4:
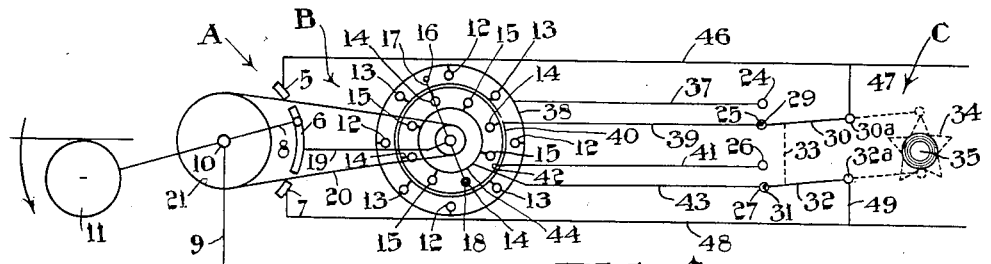

After the motor has operated to open the valve a predetermined amount the cam 34, which is driven by the valve, acts to throw the arms 30 and 32 of switch C out of engagement with the contacts 24 and 26 and into engagement with the contacts 25 and 27 (see Fig. 3). This breaks the connection between the lead-in wire 9 and the conductor 46 and de-energizes the valve motor to arrest the opening movement of the valve.

If the float continues to fall the terminal 18 (switch B) engages the adjacent contact 14, (see Fig. 4) but no current flows in conductor 48 since the connection between this conductor and the contacts 14 is then broken at switch C.

Figure 5:
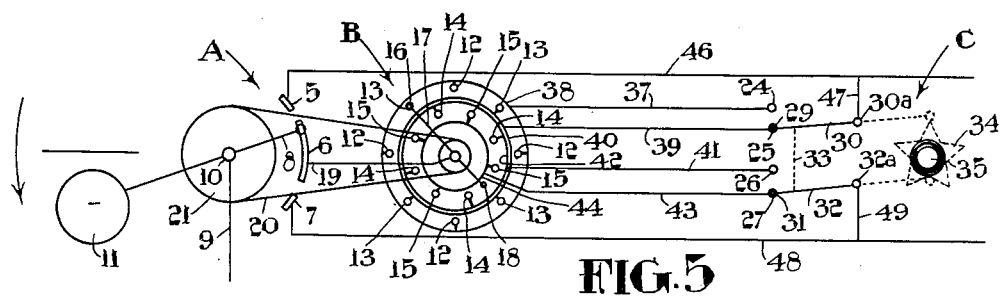
Figure 6:
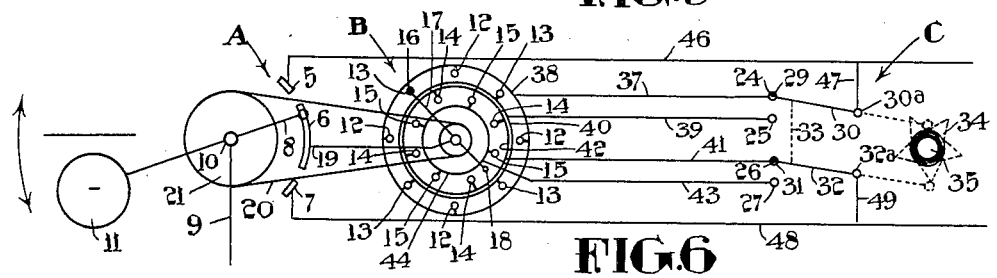

Still further falling of the float causes the terminal 16 (switch B) to engage the contact 13 as shown in Fig. 5. When this occurs current again flows in conductor 46 since contacts 13 of switch B are connected thereto through contact 25 and arm 30 of switch C. After the motor is thus again energized to open the valve a further amount the cam 34 throws the arms 30 and 32 of switch C out of engagement with the contacts 25 and 27 and back into engagement with the contacts 24 and 26 as shown in Fig. 6, again breaking the connection between the lead-in wire 9 and the conductor 46.

Figure 7:
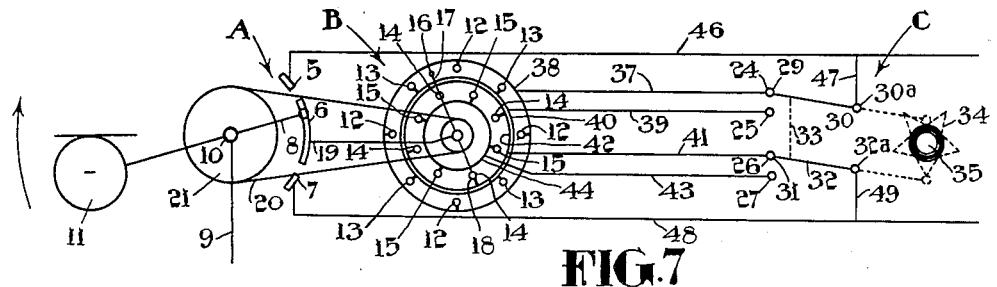
Figure 8:
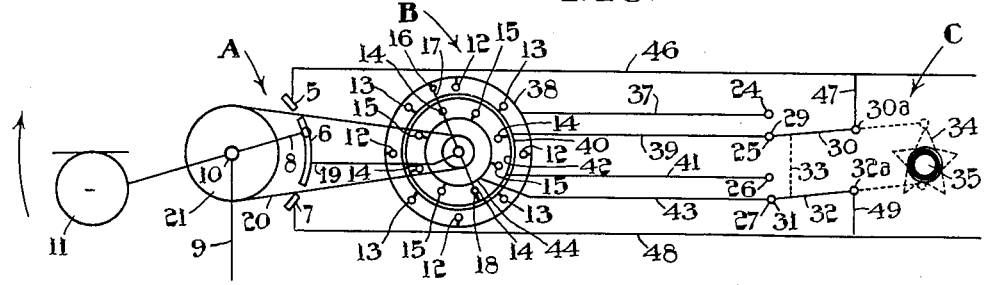

If the float now rises to the position shown in Fig. 7, the resulting clockwise motion of arm 17 causes terminal 18 to engage one of the contacts 14. Since contact 26 of switch C is, at this time, engaged by the terminal 31 of arm 32 a path is provided for the flow of current from the lead-in wire 9 to the conductor 48. The valve motor is then energized to operate in a valve closing direction. After the valve has been closed a predetermined amount the cam 34 throws the arms 30 and 32 (switch C) out of engagement with the contacts 24 and 26 and into engagement with the contacts 25 and 27, thus breaking the connection at switch C between the lead-in wire 9 and the conductor 48 as shown in Fig. 8.

Figure 9:
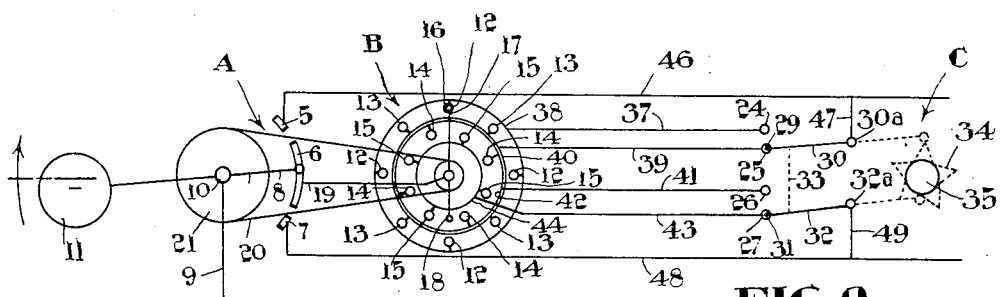
Figure 10:
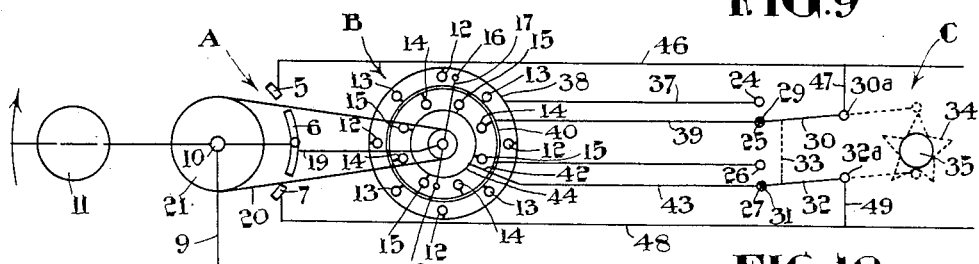

Continued rising of the float to the position shown in Fig. 9 causes the movable terminal 16 (switch B) to engage the contact 12 but no current flows in conductor 46 since the connection between this conductor and the contacts 12 of switch B is broken at switch C. When the float reaches the position shown in Fig. 10 the terminals 16 and 18 are again clear of all the stationary contacts 12, 13, 14, and 15 so that there is no further actuation of the valve, under normal condition, until the float again falls to the position shown in Fig. 2.

From the foregoing it will be apparent that the operation of switches B and C is timed so that, as long as the float continues to fall the conductor 48 will remain dead and the conductor 46 will be intermittently connected and disconnected with the lead-in wire 9 to open the valve in a step-by-step manner until the additional water supplied to the storage tank produces a rising movement of the float. As the float rises to its normal position conditions are reversed in that the conductor 46 remains dead while the conductor 48 is intermittently connected with the lead-in wire 9 to close the valve down in a step-by-step manner.

Figure 11:
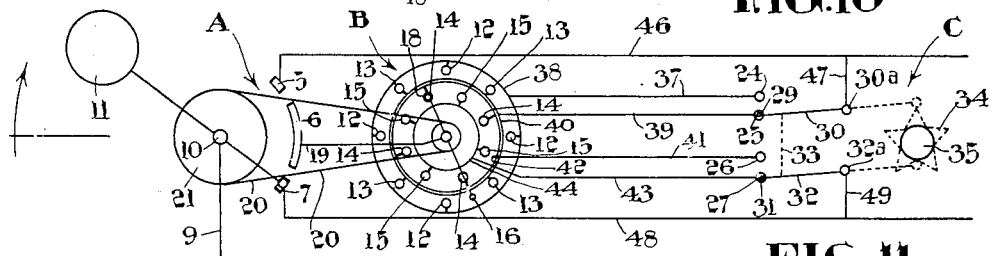
Figure 12:
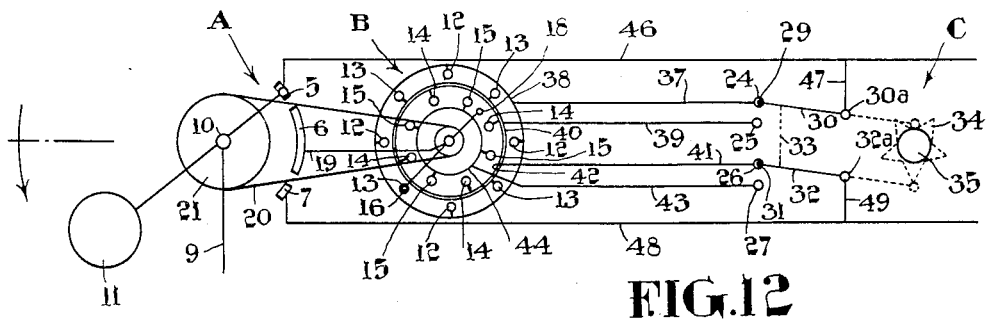

If the current should fail while the float is rising the resulting failure of the valve to close down as the water level climbs may cause the float to rise to the maximum raised position shown in Fig. 11. When this occurs the switches B and C are disconnected and the lead-in wire 9 directly connected to the conductor 46 since the arm 8 of switch A has left the contact 6 and is engaged with the contact 7. Consequently, when the current comes on again, the valve motor is energized to effect immediate and complete closure of the valve independently of the switches B and C, the valve motor being finally cut out by a suitable limit switch such as that described in my prior application. During subsequent consumption of the water in the storage tank the float falls from the position shown in Fig. 11 until the arm 8 of switch A is again engaged with the contact 6 to include switches B and C in the control circuit. If the current should fail while the float is falling, the arm 8 of switch A will pass out of engagement with the contact 6 and into engagement with the contact 5 when the float reaches the position shown in Fig. 12. Switches B and C are thus disconnected and the lead-in wire 9 directly connected to the conductor 46 to provide for a full opening of the valve when the current failure is remedied, the motor being, of course, automatically cut out by a suitable limit switch as the valve reaches its fully opened position.

Switches A and B may be modified and combined into a single unit assembly as illustrated in Figs. 13 to 16 inclusive. In these figures 52 designates a gear casing equipped with a cover 53 made of insulating material. The cover is held in place by two studs 54 which also serve as a fastening means between the cover and the engaging ends of a bracket 55. The bracket 55 is arched so that its central position is spaced from the outer surface of the cover 53 and serves as a bearing for one end of a spindle 56 which also runs in a bearing 57 afforded by the casing 52. One end of spindle 56 projects beyond the casing 52 and is fitted with a float 58 operating in a water tank 59 to which the casing is attached as indicated at 60. A gear 61 is keyed to spindle 56 and meshes with a small pinion 62 rotatably mounted on a fixed spindle 63 carried by the casing 52. A gear 64 is keyed to a sleeve extension 62a of the pinion 62 and meshes with a pinion 65 rotatably mounted on the spindle 56. Pinion 65 has an integral sleeve extension 66 to which is coupled a second rotary sleeve extension 67. An insulator or contact carrier 68, is keyed to the sleeve extension 67 and carries a metal contact ring 69 which has two spring contact arms designated 69a and 69b. A second contact carrier or insulator 70 is keyed to the spindle 56 and carries a metal contact ring 71 provided with a spring contact arm 72.

Embedded in the cover 53 are four sets of stationary contacts 74, 75, 76 and 77, arranged in two concentric circles, the contacts 74 and 75 being alternately arranged in the outer circle and the contacts 76 and 77 being similarly arranged in the inner circle in staggered relation with the contacts 74 and 75. Cover 53 also has embedded therein nine terminal studs designated 78, 79, 80, 81, 82, 83, 84, 85, and 86. As shown in Fig. 16 the contacts 74 are connected to terminals 78; the contacts 75 to terminal 79; the contacts 76 to terminal 80 and the contacts 77 to terminal 81. Terminal 84 is connected to a wiper contact 89 which (see Fig. 13) bears against the contact 69 which carries the spring contact arms 69a and 69b. These arms 69a and 69b represent the movable terminals of switch B and correspond, respectively, with the movable terminals 15 and 16 described in connection with Figs. 1 to 12 inclusive. The stationary terminals of switch B are represented in Figs. 15 and 16, by contacts 74, 75, 76 and 77.

Terminals 85 and 86 are electrically connected together as at 86a. Terminal 85 is also connected to a wiper contact 90 which (see Fig. 13) bears against the contact ring 71 which oscillates with the spindle 56 and carries the spring contact arm 72. This arm 72 represents the movable contact arm of switch A and corresponds with the arm 8 appearing in Figs. 1 to 12 inclusive. The stationary contact terminals of switch A are represented in Figs. 15 and 16 by three contacts 91, 92 and 93 which are also embedded in the cover 53. Contact 91 is connected to terminal 82; contact 92 to terminal 84 and contact 93 to terminal 83.

A lead-in wire 94 (see Fig. 16) is connected to the terminal 86 so that current flows from this terminal to the terminal 85 and thence, through the wiper contact 90 to the ring contact 71 and movable arm 72 of switch A. Under normal conditions arm 72 is always on some part of the cooperating stationary contact 92 which is connected, through terminal 84 and wiper contact 89 to the ring contact 69 and the movable terminals 69a and 69b of switch B. As clearly shown in the drawings the movable terminal 69a of switch B travels over the stationary contacts 74 and 75 while the companion terminal 69b travels over the remaining stationary contacts 76 and 77 whenever the insulator 68, which carries these movable terminals, is rotated by its gear connection with the spindle 56. In this connection it will be observed that the angular relation of terminals 69a and 69b is such that, when terminal 69a engages a stationary contact 74 or 75, terminal 69b will be midway between adjacent stationary contacts 75 and 76 and vice versa.

The parts lying at the outer side of cover 53 are enclosed by a supplementary metal cover 95 provided with an opening 96 for the passage of the various leads which are connected to the terminals 78, 79, 80, 81, 82, 83 and 86, as hereinafter described.

In Figs. 17 to 21 inclusive there is shown a modified assembly of the component parts of switch C. In these figures 96 designates a metal casing equipped with a cover 97 made of insulating material and held in place by screws 97a. These parts are provided with bearings 98 for a rotary spindle 99 which carries a fixedly secured star-pointed cam 100. The points of this cam engage a pair of pins 101 fixed to the reversely bent end 102 of a rocking lever 103 which swings about a pivot 104 carried by the casing 96 and the cover 97. The opposite end of the rocking lever carries a pin 105 which is connected, by a spring 106, to a pin 107 carried by the arm 108 of a rocking beam 109. The rocking beam is made of insulating material and is mounted to swing about the spindle 99 which passes through an elongated slot 110 in the lever 103. Two contact strips, 111 and 112, are fastened to the rocking beam as indicated at 113. The free end of strip 111 presents a T-head 111a adapted to wipe the co-operating stationary contacts 114, 115 and 116. These stationary contacts are spaced so that the T-head 111a can never connect the contact 114 to the contact 116 but may connect the contact 115 to either of the contacts 114 or 116 depending on the direction in which the rocking beam is swung about its pivot 99. The remaining contact strip of the rocking beam presents a T-head 112a adapted to wipe the stationary contacts 117, 118 and 119 which are also spaced so that the T-head 112a can never connect the contacts 117 and 119 but may connect the contact 118 to either of the contacts 117 or 119 dependent upon the direction in which the beam is rocked.

The stationary contacts 114, 115 and 116 are embedded in an insulator block 120 and are provided with threaded shank extensions 114a, 115a and 116a which pass outwardly through the cover 97 and are equipped with terminal nuts 114b, 115b and 116b. It will thus be seen that these stationary contacts and their shank extensions serve to fasten the insulator block 120 to the inner surface of the cover 97 as shown by full and dotted lines in Figs. 20 and 21.

The stationary contacts 117, 118 and 119 are embedded in a second insulator block 121 and have threaded shank extensions 117a, 118a and 119a fitted with terminal nuts 117b, 118b and 119b which serve to fasten the block 121 to the inner surface of the cover 97 in a position diametrically opposite the insulator block 120 as also shown in Figs. 20 and 21.

On referring to Fig. 19 it will be observed that when the contact strip 111 of the rocking beam is connecting the stationary contacts 114 and 115 the companion contact strip 112 is positioned to connect the stationary contacts 117 and 118. Similarly, when the contact strip 111 connects the stationary contacts 115 and 116 the strip 112 connects the stationary contacts 118 and 119.

Figure 17:
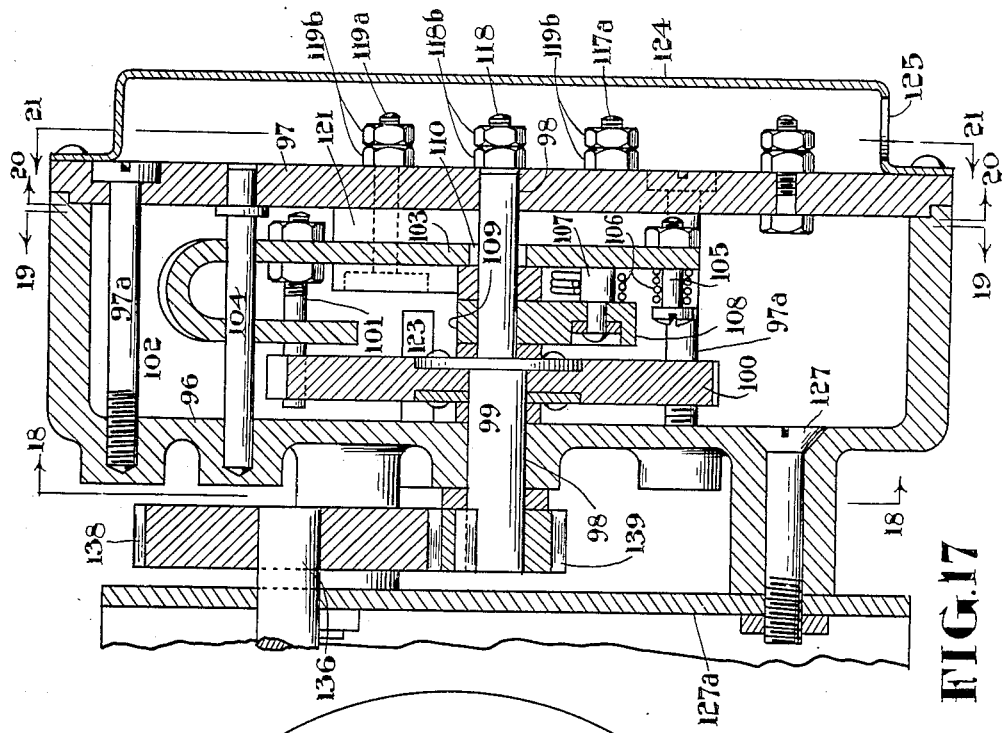
Fig. 17 is a sectional view of a modified assembly of the component elements of switch C.
Figure 18:
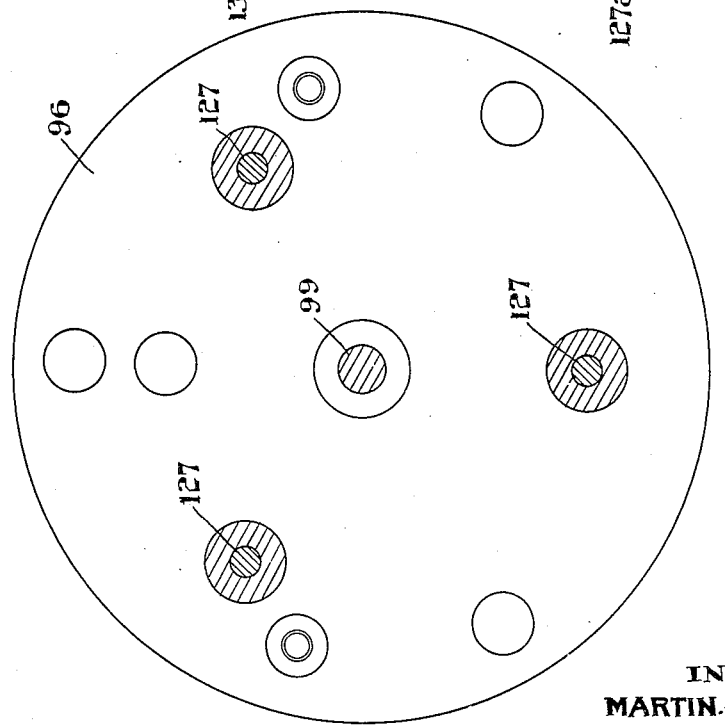
Fig. 18 is a sectional view along the line 18—18 of Fig. 17.

Angular movement of the rocking beam 109 is limited by suitable stops 122 and 123 mounted within the casing 96 as shown in Figs. 17 and 19. A metal cover 124 is fastened to the outer surface of the insulating cover 97 and is provided with an opening 125 for the passage of the leads which are connected to the contacts 114 to 119 inclusive as hereinafter described.

Figure 22:
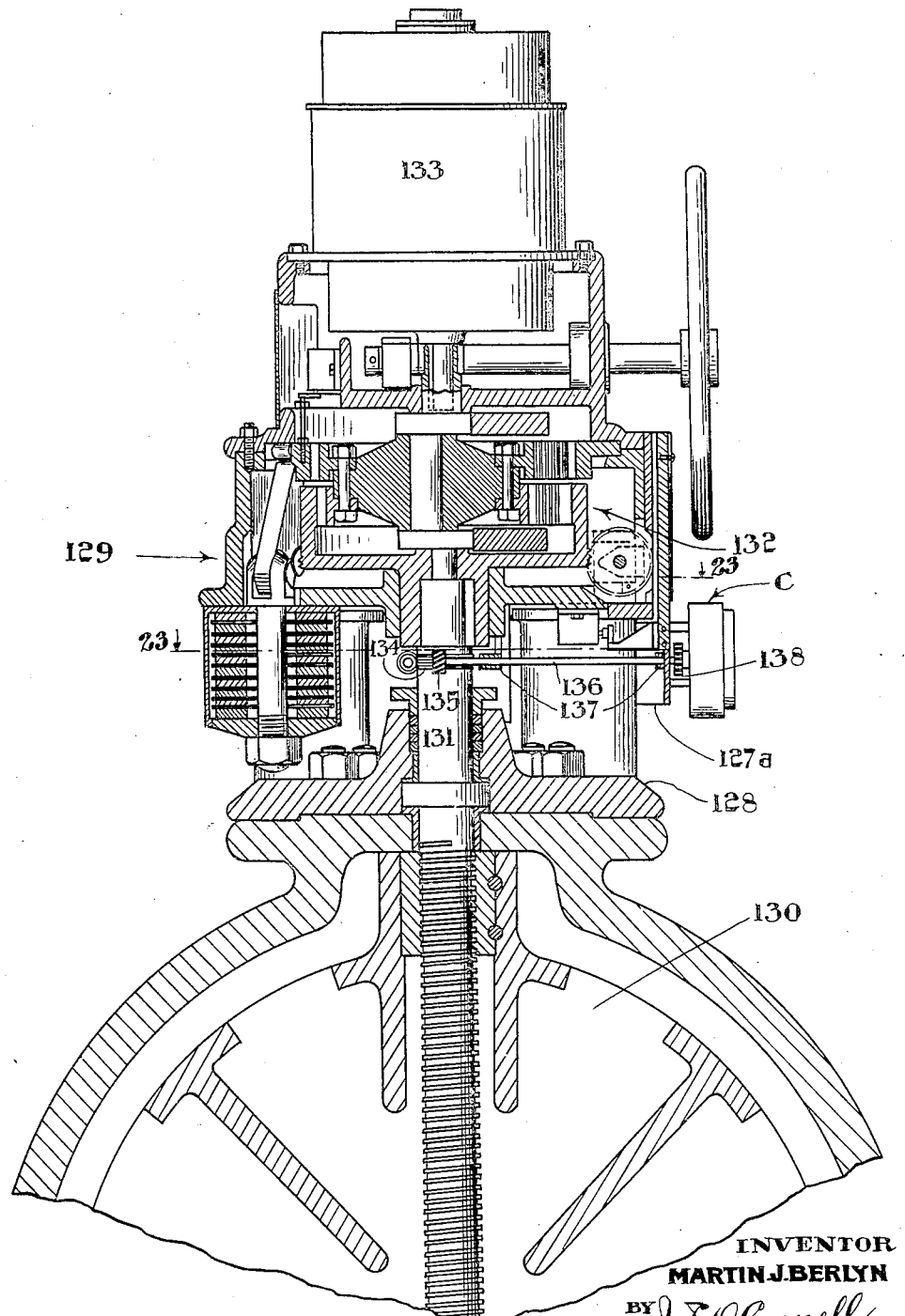
Fig. 22 is a fragmentary vertical sectional view of a motor driven valve illustrating the manner in which rotatable parts of switch C are connected to the valve stem.
Figure 23:
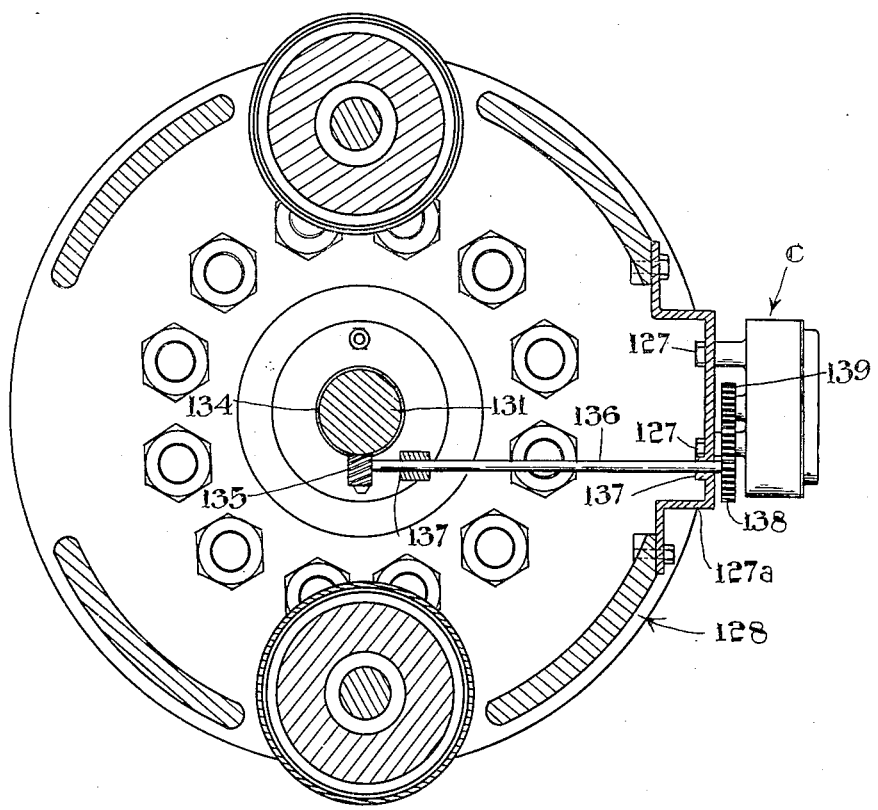
Fig. 23 is a sectional view along the line 23—23 of Fig. 22.

As indicated in Figs. 17, 22 and 23 the casing 96 of switch C is fastened by bolts 127 and bracket 127a to the casing section 128 of a motor driven valve assembly generally indicated at 129. Since the details of this valve assembly are fully set forth in my co-pending application Serial No. 612,146 filed May 18, 1932 the following brief reference is thought sufficient for present purposes. The lift valve, appearing at 130, is in screw threaded engagement with the rotary valve stem 131 which is driven, through special gearing 132, by a reversible electric motor 133. This motor is embodied in an electrical circuit, hereinafter described including a contactor or reversing switch that is automatically operated to effect intermittent opening or closing movements of the valve in response to the movements of the float controlling the operation of switches A and B.

The valve stem 131 is formed with a thread 134 meshing with a spiral gear 135 fixed to one end of a shaft 136 journalled in suitable bearings 137. A gear 138, keyed to the opposite end of the shaft 136, is in driving engagement with a pinion 139 keyed to one end of the spindle 99 of switch C. It will thus be seen that valve spindle 131 serves to rotate the spindle 99 and cam 100 of switch C in one direction during opening of the valve and in the opposite direction during closing of the valve.

With the parts in the position shown in Fig. 19 slight rotation of cam 100 in either direction will cause the lower end of the rocking lever 103 to move to the left. This swings the spring 106 about the pin 107 and also places the spring under a certain amount of compression. As soon as the center of pin 105 moves to the left of a straight line joining the centers of the pin 107 and the spindle 99 the pressure of the spring causes the rocking beam 109 to swing in an anti-clockwise direction about the revolution spindle 99 until arrested by the stop 123. Reverse movement of the cam, or further movement thereof in the same direction, will cause the lower end of the rocking lever to move to the right so that, when pin 105 passes to the right of the straight line joining the centers of the pin 107 and the spindle 99, the spring 106 will force the rocking beam to swing in a clockwise direction until arrested by the stop 122. The movement imparted to the rocking lever by the cam 100 is always sufficient to move the pin 105 from one side to the other of the straight line joining the centers of the pin 107 and the spindle 99 and when the rocking beam 109 once starts to swing under the influence of the spring 106 it cannot stop until arrested by the stop 122 or the stop 123. Consequently, it will be seen that the movable contacts 111 and 112 of the rocking beam can come to rest only in one or the other of their two circuit closing positions.

Fig. 24 shows the manner in which the switches A, B and C of Figs. 13 to 23 inclusive are connected between the lead-in wire 94 and the two conductors 147 and 149 through which current is supplied to the contactor or reversing switch 152 of the motor circuit to open and close the valve 130 in response to falling and rising movements of the float 58. In this figure a three phase source of energy for operating the motor 133 is represented by the three mains designated 153, 154 and 155. Lead-in wire 94 is first carried from the supply main 153 to an insulated terminal 141 of switch C and from thence to the terminal 86 of switch A. As previously explained terminal 86 (See Figs 15 and 16) is connected as at 86a to the terminal 85 which, in turn, is connected through wiper contact 90, and contact ring 71 with the movable contact arm 72 of switch A. Since the stationary contact 92 of switch A is connected through terminal 84 and wiper contact 89 (See Figs. 15, 16 and 13) to the movable contact arms 69a and 69b of switch B it will be seen that these movable contacts of switch B are also connected to the lead-in wire 94 and the main 153 as long as the movable arm 72 of switch A is engaged with contact 92. The terminal 78 which is common to all the contacts 74 of switch B is connected by a line wire 143 to the contact 114 of switch C. Terminal 79 which is common to all the contacts 75 of switch A is connected, by a line wire 144, to the contact 116 of switch C. Terminal 80, which is common to all the contacts 76 of switch B is connected, by a line wire 145, to the contact 117 of switch C. Terminal 81 which is common to all the contacts 77 of switch B is connected, by a line wire 146, to the contact 119 of switch C.

The conductor 147, in which current flows at times to open the valve, is connected to the contact 115 of switch C which contact is also connected by a line wire 148 to the terminal 83 of switch A. The conductor 149, in which current flows to close the valve, is connected to the contact 118 of switch C, which contact is also connected, by line wire 150, to the terminal 82 of switch B. As previously explained, terminals 83 and 82 (See Fig. 16) are respectively connected to the stationary contacts 93 and 91 of switch B.

Assuming movable contact arm 72 to be engaged with the stationary contact 92 of switch A, a path for the flow of current from lead-in wire 94, through switches A, B and C to the valve opening conductor 147 is provided only when (a) the movable contact arm 69a engages a stationary contact 74 of switch B at a time when the movable contact 111 of switch C is bridging the stationary contacts 114 and 115 or (b) when the movable contact arm 69a engages a stationary contact 75 of switch B at a time when the movable contact 111 of switch C is bridging the stationary contacts 115 and 116. Similarly, a path for the flow of current from lead-in wire 94, through the three switches, to the valve closing conductor 149, is provided only when (a) the movable contact arm 69b of switch B engages a stationary contact 76 at a time when the movable contact 112 of switch C is bridging the stationary contacts 117 and 118 or (b) when the movable contact arm 69b of switch B engages a stationary contact 77 at a time when the movable contact 112 of switch C is bridging the stationary contacts 118 and 119. Contacts 74 and 75 of switch B and contacts 114, 115 and 116 of switch C are therefore concerned only with energizing the conductor 147 to open the valve in response to falling movement of the float 58 whereas contacts 76 and 77 of switch B and contacts 117, 118 and 119 of switch C are concerned only with energizing the conductor 148 to close the valve when the float is rising.

When lead-in wire 94 is connected, through switches A, B and C, to conductor 47, the operating coil 156 of the motor reversing switch 152 is connected across the mains 153 and 155 in series with the closed limit switch 157 and the thermal overload trip-off switch 158'. Coil 156 is thus energized to shift the movable switch contacts 158 into engagement with the stationary contacts 159 thereby connecting the motor leads 161, 162 and 163 to effect operation of the motor 133 in a valve opening direction. When the valve reaches its fully opened position the limit switch 157 is tripped as described in my aforesaid prior application to open-circuit the coil 156 whereupon the movable contacts 158 are separated from the stationary contacts 159 to de-energize the motor.

When lead-in wire 94 is connected, through switches A, B and C, to the conductor 149, the operating coil 163 of switch 152 is connected across the mains 153 and 155 in series with the closed limit switch 164 and the thermal overload trip-off switch 158'. Coil 163 is thus energized to shift the movable switch contacts 165 into engagement with the stationary contacts 166 thereby connecting the motor leads 161, 162 and 163 to effect operation of the motor 133 in a valve closing direction.

In reviewing the operation of the apparatus shown in Figs. 13 to 24, it will be assumed that the movable contacts (111 and 112) of switch C are positioned as shown in Fig. 19 and that the movable contacts of switches A and B (as viewed in Fig. 15) are moving in a clockwise direction in response to rising movement of the float 58. It will also be assumed that the movable contact arm 69b of switch B, instead of being in the position actually shown in Fig. 15, is passing over the stationary contact 76 which appears immediately to the left of the wiper contact 89. Under these conditions a path is established for the flow of current from the lead-in wire 94 to the conductor 149 to effect a closing movement of the motor operated valve 130. This current flow may be traced as follows: Through lead-in wire 94 to the insulated terminal 141 of switch C (Fig. 24) and from thence to the terminal 86 of switch A; from terminal 86 through conductor 86a (Fig. 16) to the terminal 85 and from thence through wiper contact 90 to the movable contact arm 72 of switch A which is engaged with the stationary contact 92; from contact 92 to terminal 84 and from thence (Figs. 15 and 16) through wiper contact 89 to the movable contact arm 69b of switch B which is assumed to be engaged with one of the stationary contacts 76; from contact 76 to terminal 80 (Fig. 16) and from thence, through line wire 145 (Fig. 24) to the stationary contact 117 of switch C which, at this time, is connected to the conductor 149 via the movable contact 112 and the stationary contact 118 as shown in Fig. 19.

This flow of current in the conductor 149 acts, through the previously mentioned contactor or reversing switch, to energize the motor 133 (Fig. 22) to operate the valve stem 131 in a valve closing direction. This movement of the valve stem acts through the cam 100 and the rocking lever 103 (Fig. 19) to swing the rocking beam 109 about its pivot so that the movable contact 111 is transposed to a position bridging the stationary contacts 115 and 116, the companion movable contact 112 being simultaneously transposed to a position bridging the stationary contacts 118 and 119. The connection between the lead-in wire and the conductor 149 is thus broken at switch C due to the separation of the contacts 112 and 117. Current thus ceases to flow in the conductor 149 and the valve, having closed to a certain extent, comes to rest pending further movement of the float 58.

Assuming that the float continues to move upwardly the movable contact arm 69a of switch B (Fig. 15) will pass into engagement with the stationary contact 74 appearing to the right thereof. At this time all of the contacts 74 are connected via terminal 78 and line wire 143 (Figs. 16 and 24) to the contact 114 of switch C. Since the movable contact 111 of switch is now bridging the stationary contacts 115 and 116, it will be seen that the contact 114 is isolated from the conductor 147 so that this conductor remains dead. Continued upward movement of the float causes the contact arm 69b (switch B) to engage the stationary contact 77 appearing at the right of the wiper contact 90. Since all the contacts 77 are connected, through terminal 81 and line wire 146 (Figs. 15 and 16) to the stationary contact 119 of switch C and since contact 119 is, at this time, connected, through the movable contact 112 and the stationary contact 118, to the conductor 149, it follows that this conductor is again energized to effect a further closing of the valve until the cam 100 and lever 103 act to swing the rocking lever back to its initial position (Fig. 19) thus breaking the connection between contacts 118 and 119. With this explanation it will be understood that during rising movement of the float the valve closing conductor 149 will be intermittently connected with the lead-in wire 94 as the movable contact arm 69b (switch B) passes over the stationary contacts 76 and 77. It will also be understood that, during this movement of the float, the movable arm 69a (switch B) does not touch a contact 74 or a contact 75 until after the connection between such contact and the valve opening conductor 147 has been broken at a switch C.

When the float 58 rises to such an extent that the movable arm 72 (switch A) passes from the contact 92 to the contact 91 (Figs. 15 and 16) the lead-in wire 94 is directly connected to the conductor 149 to effect a rapid and continuous movement of the valve to a fully closed position to take care of emergency conditions such as the current failure previously referred to in connection with the arrangement shown in Fig. 1. In this instance (see Figs. 15, 16 and 24) a direct path for the flow of current between the lead-in wire and the conductor 149 is provided via terminals 86 and 85, wiper contact 90, movable arm 72, contact 91, terminal 82, line wire 150, and terminal 116.

When the float 58 is falling conditions are reversed in that the rotating parts of switches A and B rotate in an anti-clockwise direction and the valve opening conductor 147 is energized whenever the movable contact arm 69a (switch B) touches a stationary contact 74 or 75. During this movement of the float the movable arm 69b (switch B) does not touch a stationary contact 76 or 77 until after the connection between such contact and the valve closing conductor 149 has been broken at switch C.

If the float falls to the position where the movable contact arms 72 (switch A passes from the stationary contact 92 to the stationary contact 93, this completes a direct connection between the lead-in wire 94 and the valve opening conductor 147 so that there results a continuous movement of the valve to fully opened position. In this case the current flows from the lead-in wire to conductor 147 via terminals 86 and 85, wiper contact 90, movable contact arm 72, stationary contact 93, terminal 83, line wire 148 and terminal 115 of switch C.

In the foregoing I have described what I now consider to be a preferred embodiment of my invention as applied to the control of a water supply valve in response to changing water level conditions in a storage tank supplied by said valve. It is obvious, however, that the invention is useful in other relations and that the component elements thereof are susceptible of various modifications to suit particular installations. For example, the float herein described may be replaced by a manually operable lever or by a pressure gage, Venturi meter, thermometer, flyball head, or any other form of primary control member. Similarly, the controlled member or valve described in the instant case may be replaced by any other form of device capable of electrical control in accordance with the principles of the present invention. With these considerations in mind the terms "primary control member" and "electrically actuated device" appearing in the appended claims, are used in a broad sense to cover all equivalents of the float and motor operated valve herein described, when such equivalents are used in accordance with the present invention.

Having thus described my invention, what I claim is:—

1. In combination, a pair of conductors associated with one side of a source of current, an electrically actuated device operable in one direction in response to current flow in one of said conductors and in the opposite direction in response to current flow in the other conductor, a pair of line wires for supplying current to one of said conductors, a second pair of line wires for supplying current to the other conductor, a switch for alternately connecting the line wires of the first mentioned pair to the conductor intended to receive current therefrom, a second switch for alternately connecting the line wires of the second mentioned pair to the conductor intended to receive current therefrom, means for operating said switches simultaneously in response to movement of said electrically actuated device whenever the latter is operated in response to current flow in one of said conductors, a primary control member and switch means operated by said primary control member for successively connecting said line wires to the other side of the source of current, the arrangement of the several switch mechanisms being such that, during continued movement of the primary control member in one direction, the line wires of one conductor remain dead while current is alternately supplied through the remaining line wires to the remaining conductor to affect an intermittent movement of the electrically actuated device in one direction, said last mentioned line wires remaining dead and the other line wires being alternately energized to reverse the direction of movement of the electrically actuated device in response to a similar reversal in the direction of movement of the primary control member.

2. The combination claimed in claim 1, in which the switch means operated by said primary control member includes a pair of insulated contacts to which the conductors are directly connected and a movable contact adapted to connect one of said insulated contacts directly to said other side of the source of current when the primary control member is moved an abnormal distance in one direction and to connect the remaining insulated contact directly to the source of current when the primary control member is moved an abnormal distance in the opposite direction.

3. In combination, a pair of conductors associated with one side of a source of current and an electrically actuated device operable in one direction in response to current flow in one of said conductors and in the opposite direction in response to current flow in the companion conductor, a pair of line wires for supplying current to one of said conductors, a second pair of line wires for supplying current to the other conductor, a switch for alternately connecting the line wires of the first mentioned pair to the conductor intended to receive current therefrom, a second switch for alternately connecting the line wires of the second mentioned pair to the conductor intended to receive current therefrom, each of said switches including two stationary contacts to which the associated line wires are connected and co-operating movable contact means functioning in response to movement of said electrically actuated device to alternately make and break the circuit between each of said stationary contacts and the conductor served by said switch, the movable contact means of the two switches connected between the line wires and the conductors being mechanically interconnected to move in unison in response to movement of said electrically actuated device, a primary control member and means operated by said primary control member for successively connecting the line wires to the other side of the source of current so that, during movement of the primary control member in one direction, the line wires of one pair will remain dead while the line wires of the remaining pair will be intermittently and alternately connected in circuit with the source of current and the remaining conductor, the particular conductor thus intermittently energized in response to movement of the primary control member being determined by the direction in which the primary control member is moved.

4. In combination, a pair of conductors associated with one side of a source of current, an electrically actuated device operable in one direction in response to current flow in one of said conductors and in the opposite direction in response to current flow in the other conductor, a pair of line wires for supplying current to one of said conductors, a second pair of line wires for supplying current to the other conductor, a separate switch for alternately connecting the line wires of each pair to the conductor intended to receive current therefrom, each of said switches comprising a pair of stationary contacts to which the line wires of one pair are connected and movable contact means for alternately connecting the stationary contacts to the conductor served by said pair of line wires, said movable contact means of each switch being operated by the electrically actuated device in unison with the movable contact means of the companion switch in such manner that the movable contact means of each switch, when moved in response to the movement of the electrically actuated device, is permitted to come to rest only in contact with one or the other co-operating stationary contacts, a primary control member and switch means operated by said primary control member for successively connecting the line wires to the other side of the source of current, said last mentioned switch means including a separate set of stationary contacts connected to each of said line wires, a movable contact arm adapted to engage alternately with the stationary contacts connected with the two line wires serving one of said conductors, a second movable contact arm adapted to engage alternately with the stationary contacts of the two line wires serving the remaining conductor, said movable contact arms and the co-operating stationary contacts being arranged so that, during continued movement of the primary control member in one direction, the line wires serving one of said conductors are alternately included in a closed circuit including said conductor and said source of current, the particular conductor and line wires thus energized being dependent upon the direction in which the primary control member is moved.

5. In combination, a pair of conductors associated with one side of a source of current, an electrically actuated device operable in one direction in response to current flow in one of said conductors and in the opposite direction in response to current flow in the other of said conductors, a pair of line wires for supplying current to one of said conductors, a second pair of line wires for supplying current to the other conductor, a separate switch for alternately connecting the line wires of each pair to the conductor intended to receive current therefrom, each of said switches comprising a pair of stationary contacts to which the associated line wires are separately connected and movable contact means operated by the electrically actuated device to alternately connect each of said stationary contacts with their respective conductor during movement of said electrically actuated device in response to current flow in one or the other of said conductors a separate set of spaced stationary contacts connected to each of said line wires, a movable contact arm adapted to alternately engage the stationary contacts of the two sets connected to the line wires serving one of said conductors, a second movable contact arm adapted to alternately engage with the stationary contacts of the two remaining sets connected to the line wires serving the remaining conductor, the other side of the source of current being connected to each of said last mentioned contact arms, a primary control member, and means driven by the primary control member for operating said last mentioned contact arm in one direction or the other dependent upon the direction of movement of said primary control member.

6. In combination, a pair of conductors associated with one side of a source of current, an electrically actuated device operable in one direction in response to current flow in one conductor and in the opposite direction in response to current flow in the other conductor, a pair of line wires for each conductor adapted to be alternately connected therewith, a separate switch operating automatically to intermittently and alternately connect the line wires of each pair to the conductor intended to receive current therefrom when the electrically actuated device is operated in one direction or the other in response to current flow in one of said conductors, a separate set of stationary contacts connected to each of said line wires, a movable contact arm adapted to engage alternately the stationary contacts of the two sets connected to the line wires serving one of said conductors, a second movable contact arm alternately engageable with the stationary contacts of the two sets connected to the line wires serving the remaining conductor, said movable contact arms being connected together to move in unison and being relatively arranged so that when one of said contact arms is engaged with one of its co-operating stationary contacts the companion contact arm will be located in an open circuit positioned between two of its co-operating stationary contacts, a primary control member, a movable contact arm actuated by said primary control member and permanently connected to the other side of the source of current, a stationary contact engaged by said last mentioned movable arm during normal movements of the primary control member, means for conducting current from said stationary contact to the movable contact arms co-operating with the stationary contacts connected to the line wires, and a pair of auxiliary contacts connected to said conductors and arranged at opposite sides of the stationary contact engaged by the movable contact arm actuated by the primary control member, said last mentioned movable contact arm being arranged to pass out of engagement with the co-operating stationary contact and into engagement with one or the other of said auxiliary contacts when the primary control member is moved to an abnormal range.

MARTIN J. BERLYN.